(12) United States Patent
Hoff et al.

(10) Patent No.: US 7,624,893 B2
(45) Date of Patent: Dec. 1, 2009

(54) COOKWARE HANDLE WITH METAL INSERT AND OVERMOLD

(75) Inventors: Susan K. Hoff, Belmont, MI (US); Rick G. Good, Rockford, MI (US); Kam Yuan Li, Kwun Tong (HK)

(73) Assignee: Access Business Group International LLC, Ada, MI (US)

( * ) Notice: Subject to any disclaimer, the term of this patent is extended or adjusted under 35 U.S.C. 154(b) by 632 days.

(21) Appl. No.: 11/277,620

(22) Filed: Mar. 28, 2006

(65) Prior Publication Data
US 2007/0228056 A1 Oct. 4, 2007

(51) Int. Cl.
  B65D 25/28 (2006.01)
  A47J 36/00 (2006.01)
  B25G 1/10 (2006.01)
  B25G 1/12 (2006.01)
  A47J 27/00 (2006.01)
  A47J 37/10 (2006.01)

(52) U.S. Cl. .................. 220/753; 220/752; 220/755; 220/759; 220/573.1; 220/912; 16/421; 16/425; 16/DIG. 12

(58) Field of Classification Search ............... 16/421, 16/425, 430, DIG. 12; 220/573.1–573.5, 220/752, 753, 755, 759, 912
See application file for complete search history.

(56) References Cited

U.S. PATENT DOCUMENTS

| | | | | |
|---|---|---|---|---|
| 1,067,231 A | * | 7/1913 | Antoni | 76/101.1 |
| 1,487,749 A | * | 3/1924 | Martus | 16/421 |
| 1,577,470 A | * | 3/1926 | Koehler | 220/776 |
| 1,746,093 A | * | 2/1930 | Thompson | 220/759 |
| 1,965,354 A | | 7/1934 | Patock | |
| D94,697 S | * | 2/1935 | Krause | D7/395 |
| 2,133,252 A | | 10/1938 | Moore et al | |
| 2,172,524 A | * | 9/1939 | Stevens | 220/776 |
| 2,205,819 A | * | 6/1940 | Mattoon | 220/753 |
| 2,345,248 A | * | 3/1944 | Farber | 220/776 |

(Continued)

FOREIGN PATENT DOCUMENTS

CN 2587307 Y 11/2003

OTHER PUBLICATIONS

Pictures of cookware handles, Prior Art.

*Primary Examiner*—Anthony Stashick
*Assistant Examiner*—Ned A Walker
(74) *Attorney, Agent, or Firm*—Warner Norcross & Judd LLP

(57) ABSTRACT

A cookware handle includes a metal insert and a cured phenolic overmold molded over the insert. The metal insert may be shaped to prevent movement of the overmold with respect to the insert, and may include a screw boss for attaching the handle to a cookware vessel. The overmold is molded over the insert into the shape of a handle. The overmold may encapsulate the insert, and may define a hole aligned with the screw boss to receive a screw that extends through the screw boss and into the cookware vessel. The present invention also includes a method for manufacturing a cookware handle, including the steps of a) providing a metal insert having an attachment portion; b) overmolding a phenolic molding material over the insert, the overmold shaped in the form of a cookware handle; and c) attaching the overmold and insert to a cookware vessel with the attachment portion of the insert.

8 Claims, 6 Drawing Sheets

U.S. PATENT DOCUMENTS

| | | | | |
|---|---|---|---|---|
| D143,164 S | * | 12/1945 | Ramsthal | D7/361 |
| 2,431,808 A | * | 12/1947 | Kluit | 220/755 |
| 2,522,579 A | * | 9/1950 | Le Rette | 220/753 |
| 2,787,805 A | * | 4/1957 | Kraemer et al. | 220/753 |
| 2,815,527 A | * | 12/1957 | Hollaway, Jr. et al. | 220/753 |
| 3,143,759 A | | 8/1964 | Kennedy | |
| 3,185,001 A | * | 5/1965 | Viator | 81/177.1 |
| 3,306,648 A | * | 2/1967 | Serio | 294/27.1 |
| 3,474,486 A | * | 10/1969 | Serio et al. | 220/759 |
| 3,616,964 A | | 11/1971 | Yamazaki | |
| 3,648,887 A | | 3/1972 | Hartley | |
| 4,008,822 A | | 2/1977 | Carroll | |
| 4,032,032 A | | 6/1977 | Carroll et al. | |
| 4,083,081 A | * | 4/1978 | Witte | 220/759 |
| 4,197,611 A | | 4/1980 | Bell et al. | |
| 4,680,829 A | * | 7/1987 | Baumgarten | 220/759 |
| 4,729,271 A | * | 3/1988 | Kenigson | 81/177.1 |
| 4,761,851 A | * | 8/1988 | Day et al. | 220/752 |
| 4,781,302 A | | 11/1988 | Pearson | |
| 4,794,666 A | * | 1/1989 | Kim | 220/753 |
| 4,811,637 A | * | 3/1989 | McCleary | 81/177.2 |
| 4,825,505 A | * | 5/1989 | Witte | 16/425 |
| 4,926,521 A | * | 5/1990 | Gagnepain | 220/755 |
| D312,031 S | * | 11/1990 | McCleary | D8/14 |
| 4,974,287 A | * | 12/1990 | Fischbach | 16/425 |
| 5,331,869 A | * | 7/1994 | Webb | 81/177.1 |
| 5,666,874 A | * | 9/1997 | Wang | 99/348 |
| 5,673,458 A | | 10/1997 | Raoult | |
| 5,730,231 A | * | 3/1998 | Racodon | 173/162.2 |
| 5,867,867 A | | 2/1999 | Kessler | |
| 5,946,773 A | * | 9/1999 | Esker et al. | 16/422 |
| 6,089,130 A | * | 7/2000 | Wu | 81/170 |
| 6,170,694 B1 | | 1/2001 | Munari | |
| 6,325,238 B1 | * | 12/2001 | Munari | 220/759 |
| 6,367,125 B1 | * | 4/2002 | Lin | 16/436 |
| 6,405,619 B1 | * | 6/2002 | Lamond et al. | 81/177.1 |
| 6,439,421 B1 | | 8/2002 | Lin | |
| D485,120 S | * | 1/2004 | Kight | D7/395 |
| D490,270 S | * | 5/2004 | Pippel et al. | D7/395 |
| 6,782,778 B2 | * | 8/2004 | Watson | 81/427.5 |
| 6,848,355 B2 | * | 2/2005 | Cesare | 99/342 |
| D518,331 S | * | 4/2006 | Rae | D7/395 |
| D519,316 S | * | 4/2006 | Plichon | D7/395 |
| 7,028,374 B2 | * | 4/2006 | Fiocco | 16/422 |
| D530,148 S | * | 10/2006 | Knorr | D7/395 |
| 7,204,387 B2 | * | 4/2007 | Munari | 220/755 |
| 7,490,732 B2 | * | 2/2009 | Wasserman et al. | 220/753 |
| 2004/0163548 A1 | | 8/2004 | Pacenti | |

* cited by examiner

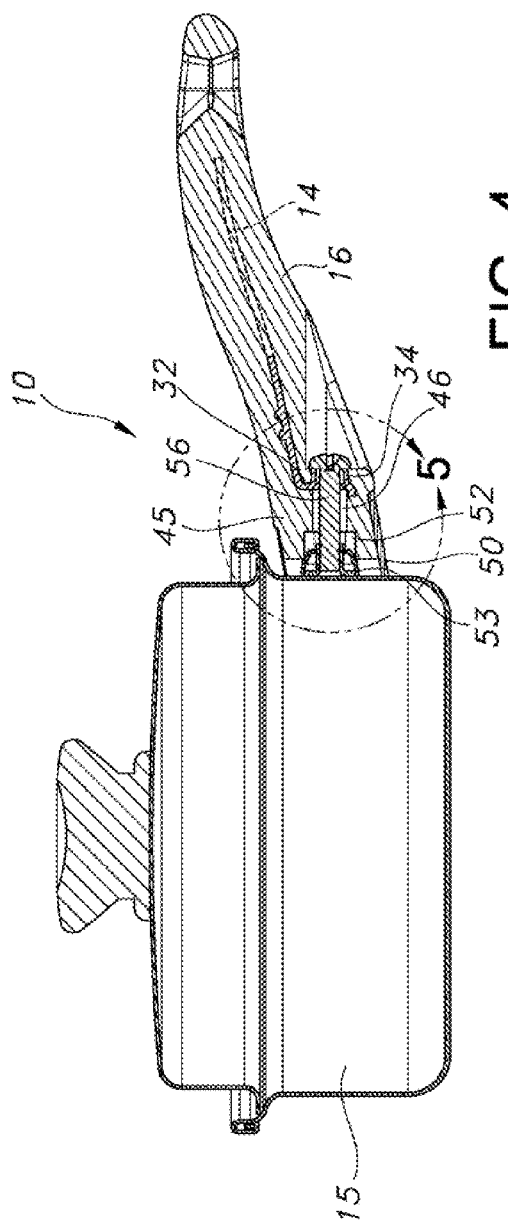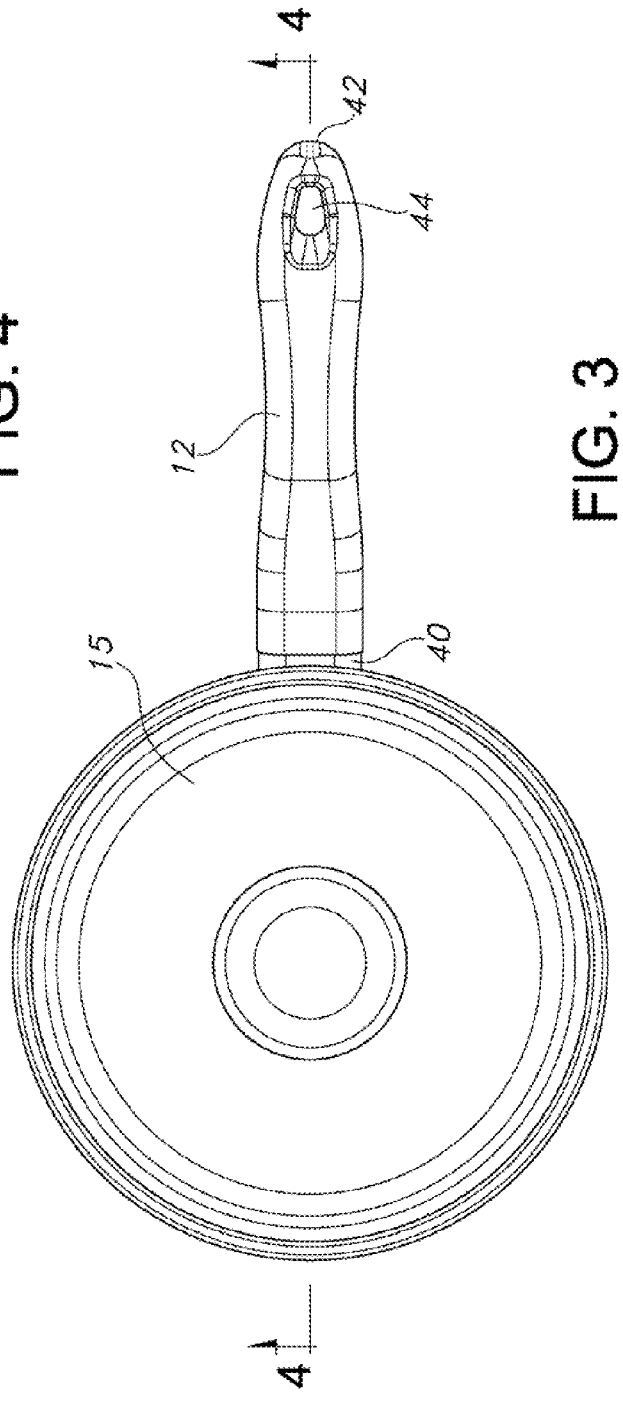

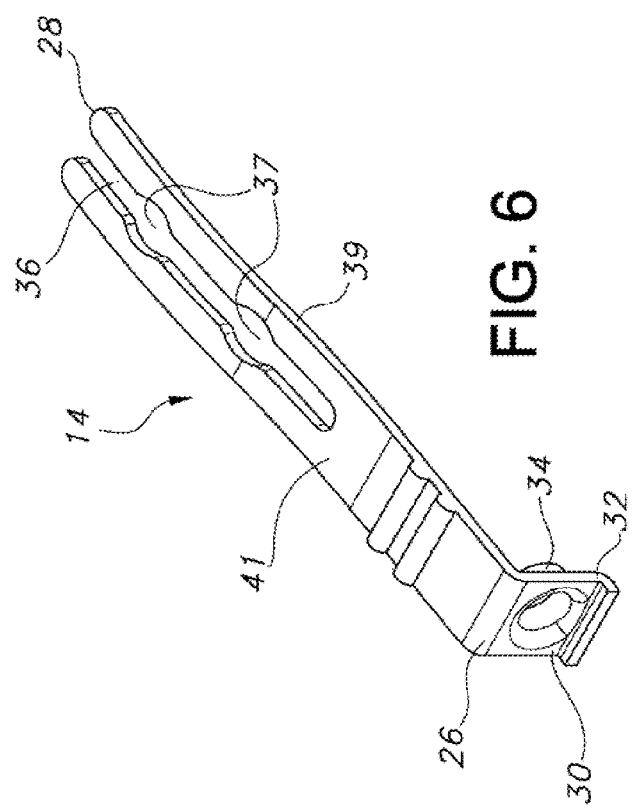
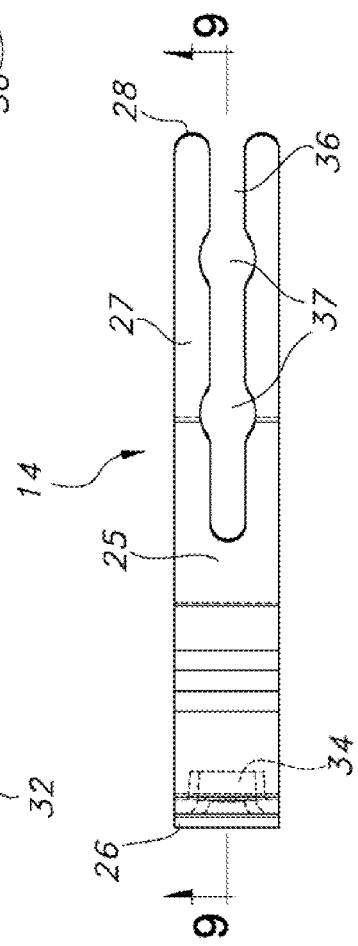
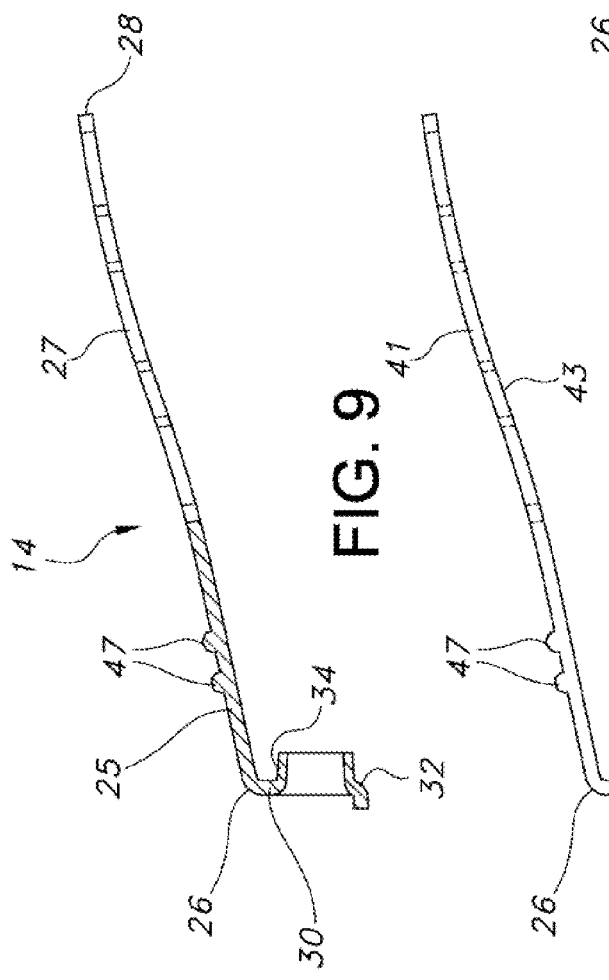
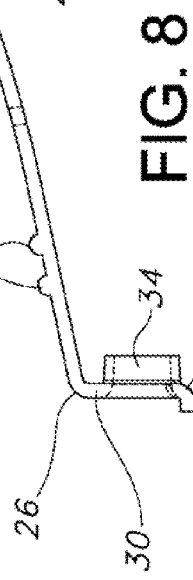

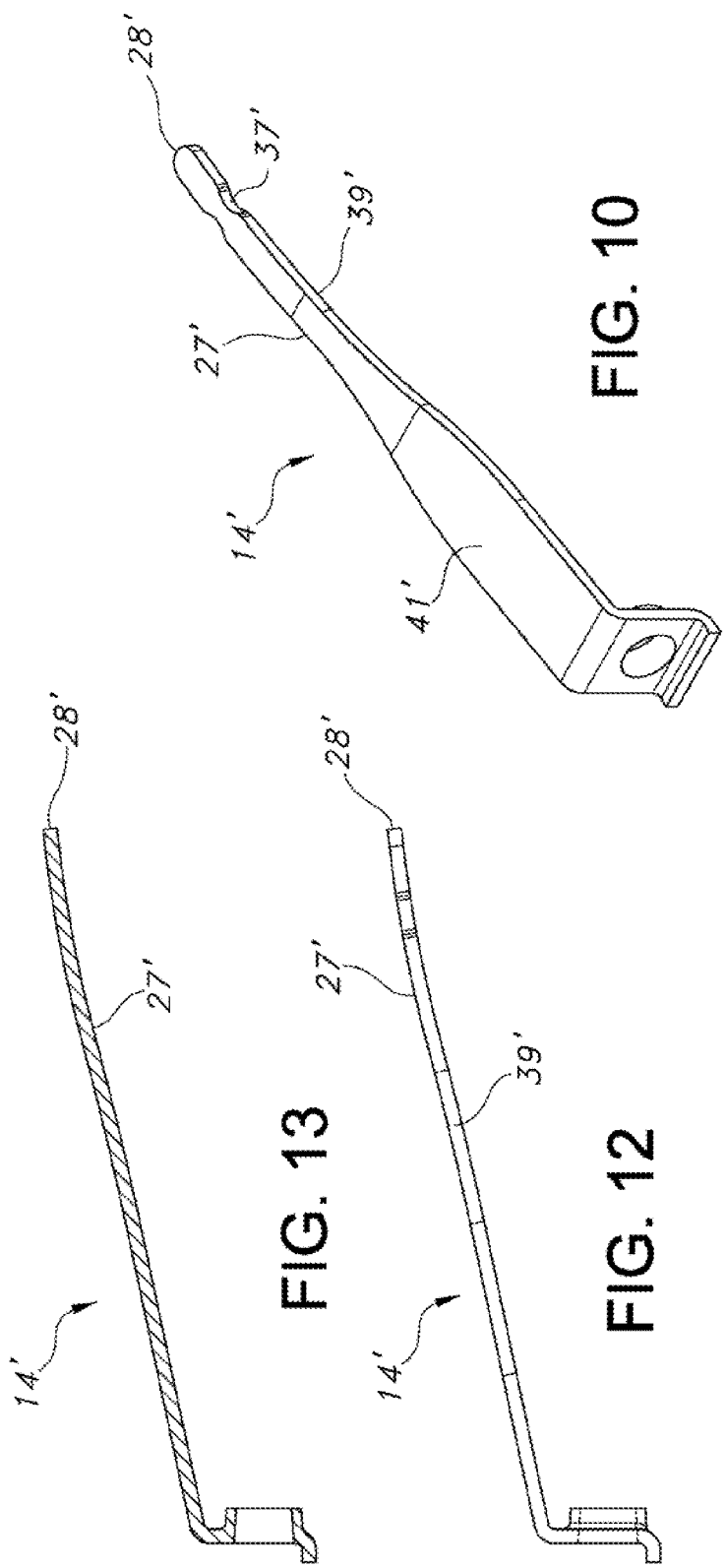
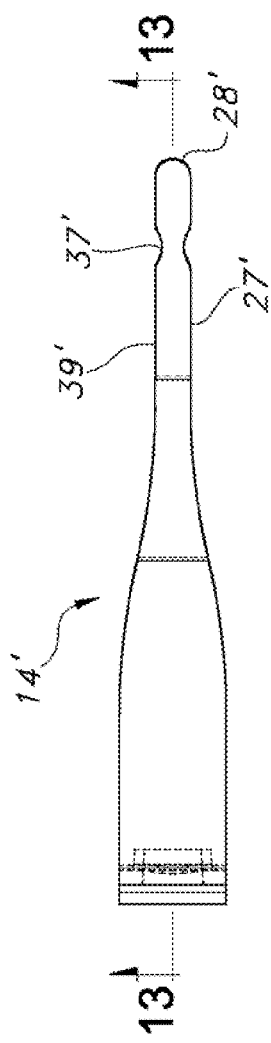
FIG. 10
FIG. 11
FIG. 12
FIG. 13

COOKWARE HANDLE WITH METAL INSERT AND OVERMOLD

BACKGROUND OF THE INVENTION

The present invention relates generally to cookware handles, and more particularly to a long-lasting, high-heat resistant cookware handle.

Many different types of handles are known in the cookware industry for attachment to cookware vessels such as saucepans, frying-pans and the like. These handles must endure the rigorous kitchen environment, and enable the vessels to be gripped easily, even when hot. The best handles, therefore, are those with good thermal insulation properties and high durability.

Cookware handles are often formed from a cured phenolic resin or another thermosetting polymer. Phenolic molding materials have high-heat resistant characteristics and are resistant to deterioration. Very commonly, these phenolic handles are solid, compression molded parts that attach to a cookware vessel, for instance, by a screw boss molded into the handle.

Unfortunately, even phenolic handles can fail under extreme conditions, such as direct contact with a gas flame. These failures can be dangerous, especially if a handle breaks when the vessel is filled with extremely hot materials. Therefore, various attempts have been made at reinforcing these handles to prevent catastrophic failures. For instance, some manufacturers from hollow phenolic handles and insert a metal screw into the handle along the length of the handle as a strengthening reinforcement. However, these handles are still susceptible to dangerous failures because the phenolic is not well secured to the screw and may rotate about the screw. Other manufacturers have tried molding soft materials, like silicone rubber, over metal handles attached to a cookware vessel, but these soft materials do not last long and may not have the heat-resistant qualities of phenolic or other thermosetting polymers.

SUMMARY OF THE INVENTION

The aforementioned problems are overcome by the present invention, wherein a cookware handle includes a metal insert and a cured phenolic overmold molded over the insert.

In one embodiment, the metal insert includes a screw boss for attaching the handle to a cookware vessel. The overmold is molded over the insert into the shape of a handle. The overmold may encapsulate the insert and the screw boss, and may define a hole aligned with the screw boss to receive a screw that extends through the screw boss and into the cookware vessel. In another embodiment, a spacer interfits with the hole in the overmold and the vessel to maintain an air gap between the handle and the vessel.

In another embodiment, the metal insert is configured to prevent movement of the overmold with respect to the insert. The metal insert may include a flat portion and a portion that is cured to match the shape of the overall cookware handle. The insert may also include a one or more notches extending through the insert. In this embodiment, the overmold extends around and through the notch to secure the overmold to the insert and prevent rotation of the overmold about the insert.

The present invention also includes a method for manufacturing a cookware handle, including the steps of a) providing a metal insert having an attachment portion; b) overmolding a phenolic over the insert, the overmold shaped in the form of a cookware handle; and c) attaching the overmold and insert to a cookware vessel with the attachment portion of the insert.

The phenolic overmold of the present invention provides a long-lasting, high-heat resistant cookware handle with reinforced strength. The overmold molded over the insert provides a long lasting, secure connection between the overmold and the insert. The shape and configuration of the insert prevent unwanted rotation or other movement of the overmold with respect to the insert. The attachment of the handle to a cookware vessel via the metal insert enables a secure connection of the handle to the cookware vessel, and the air gap created by the spacer reduces the heat transfer from the vessel to the handle.

These and other objects, advantages, and features of the invention will be readily understood and appreciated by reference to the detailed description of the current embodiments and the drawings.

BRIEF DESCRIPTION OF THE DRAWINGS

FIG. 3 is a top view of the cookware vessel including a cookware handle according to one embodiment of the present invention.

FIG. 4 is a side cross sectional view of the handle and vessel along line 4-4 in FIG. 3.

FIG. 6 is a perspective view of one embodiment of the insert.

FIG. 7 is a top plan view thereof.

FIG. 8 is a side plan view thereof.

FIG. 9 is a side cross sectional view thereof along line 9-9 in FIG. 7.

FIG. 10 is a perspective view of a second embodiment of the insert.

FIG. 11 is a top plan view thereof.

FIG. 12 is a side plan view thereof.

FIG. 13 is a side cross sectional view thereof along line 13-13 in FIG. 11.

DETAILED DESCRIPTION OF THE INVENTION

I. Overview

Figure 1:
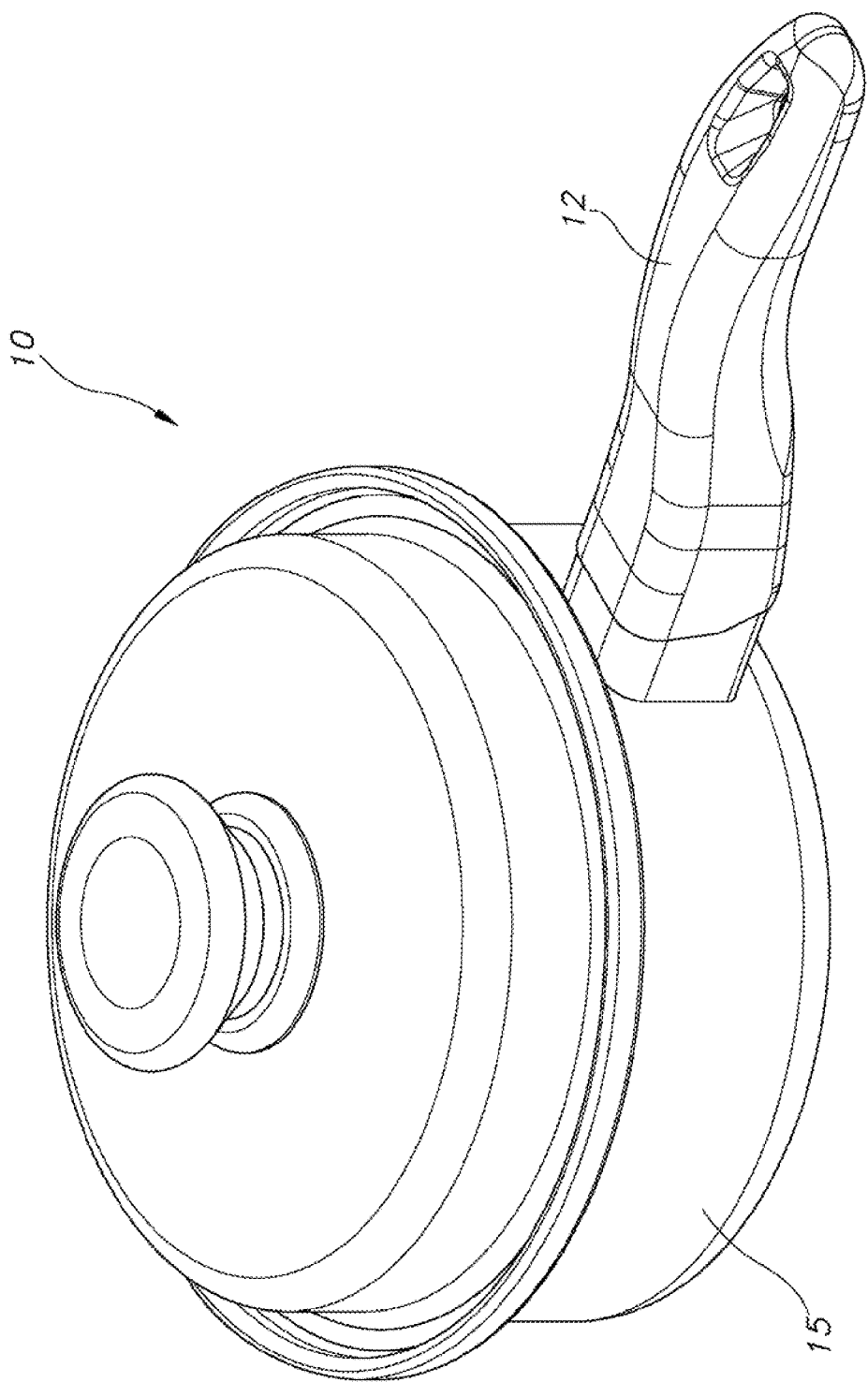
FIG. 1 is a perspective view of a cookware vessel and handle according to one embodiment of the present invention.

A article of cookware 10 including a cookware handle 12 according to one embodiment of the present invention is shown in FIG. 1. Shown in FIG. 2, the handle 12 generally includes a metal insert 14 and a cured phenolic overmold 16 molded over the metal insert 14. The metal insert 14 includes a screw boss 34 for connecting the handle 12 to the vessel 15.

II. Structure

For purposes of illustration, the present invention is shown and described in an embodiment where the vessel 15 is a conventional saucepan, however, the vessel may alternatively be any desired article of cookware, or another non-cookware vessel that requires a high-heat resistant, durable handle. As shown, the vessel 15 is manufactures of a conventional material, such as stainless steel, and includes a bottom 20 and a sidewall 22 extending from the bottom 20. The sidewall 22 of this embodiment includes at least one attachment point 25 for attaching the handle 12. As illustrates, the attachment point as a screw boss 18, but the attachment may be made by a variety of known attachment devices.

The insert 14, shown in FIGS. 6-13, is generally formed from a flat metal stock, such as stainless steel or another metal. Alternatively, the insert 14 may be formed from a solid block of material or a tubular material of a desired cross-section. The insert 14 may have a non-circular or asymmetric shape that resists rotation of the overmold 16 with respect to the insert 14. In one embodiment, shown in FIGS. 6-9, the insert 14 includes at least one substantially flat surface which may prevent rotation of the overmold 16 with respect to the insert 14. The insert 14 may also be shaped to resist relative movement between the insert 14 and the overmold 16 in the longitudinal direction. As shown, the insert 14 is slightly curved to mimic the shape of the overall handle 10 and includes a first portion 25 and a second portion 27. The curved shape may serve to prevent removal of the insert 14 from the overmold 16, for instance, in the event that the overmold 16 is compromised by heat. The first portion 25 is generally flat, and includes a first end 26 having an attachment portion 30 extending therefrom. The attachment portion may be a flange 32 extending downwardly from the first end 26 and including a screw boss 34 attached to the flange 32. Alternatively, the attachment portion may be configured to be welded, riveted, or otherwise attached to the vessel. In the embodiment shown in FIGS. 6-9, the second portion 27 is slightly curved to match the shape of the overall handle 10, and includes a second end 28 that is forked, such that it defines a slot 36 extending through the insert 14. As shown in FIGS. 6 and 7, the slot 36 is generally U-shaped, and may include a number of notched areas 37. Alternatively, the slot 36 may be a continuous U-shape, or may have another desired shape. In another embodiment, the slot 36 may be replaced by a hole or a plurality of protrusions extending from the upper surface 41, lower surface 43, or outer edge 39 of the insert 14 such that the overmold can be molded about that protrusions 47. In yet another alternative embodiment, shown in FIGS. 10-13, the second portion 27' includes one or more notched areas 37' in the outer edge 39' of the insert 14'. The notched areas 37' may be added such that the insert forms a solid end 28' instead of the forked end 28 shown in FIGS. 6-9. Alternatively, the notches 37' may be added in addition to the forked end 28 (not shown).

Figure 2:
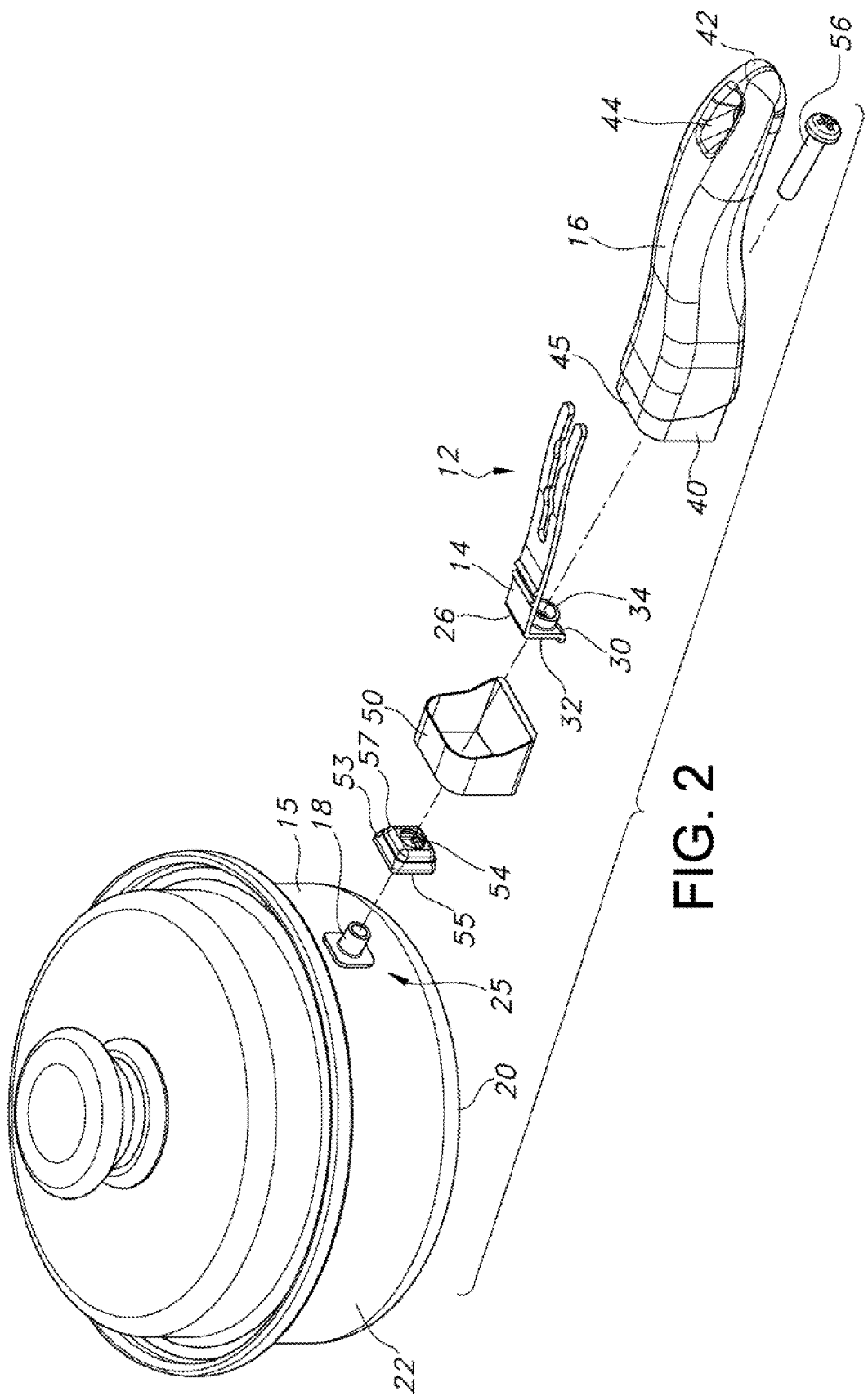
FIG. 2 is an exploded view of the vessel and handle thereof.
Figure 5:
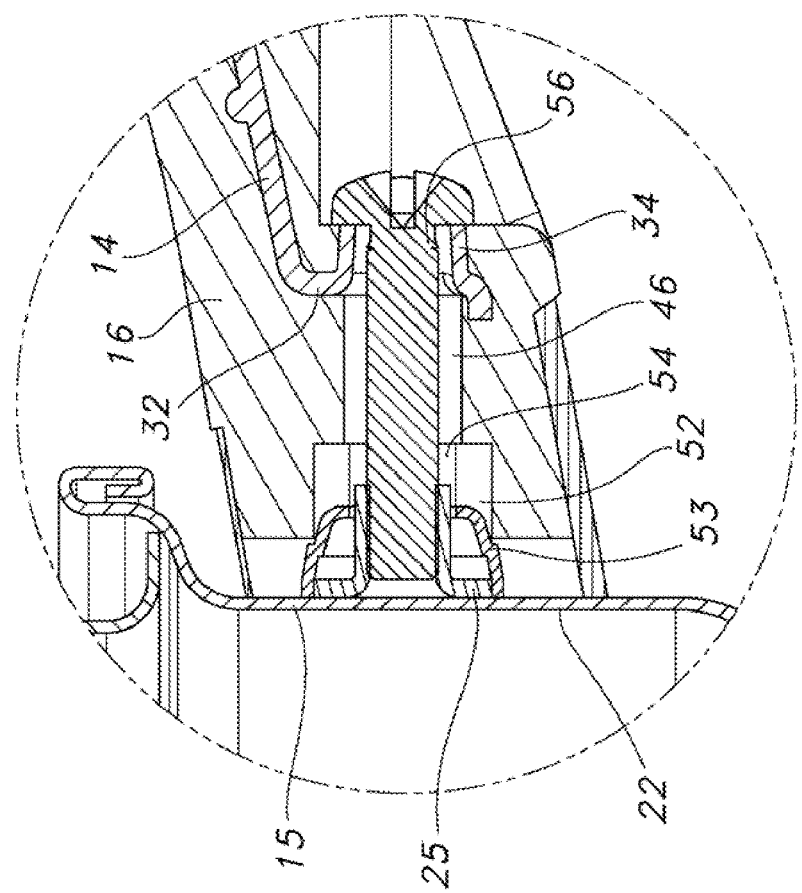
FIG. 5 is a side cross sectional view of the portion of the handle circled in FIG. 4.

The overmold 16 is generally manufactured from a molded thermosetting polymer, such as a cured thermoset phenolic molding material. As shown in FIG. 4, the overmold 16 is molded over the insert 14 into the shape of a typical cookware handle. A wide variety of cookware handle shapes could otherwise be formed. In one embodiment, the overmold 16 is molded over the insert 14 such that the insert 14 extends through a substantial portion of the overmold 16 (i.e. about 50% of the length of the overmold), however, the insert 14 can extend any desired distance through the overmold 16. Referring now to FIG. 2, the overmold 16 includes an attachment end 40, and a distal end 42. The overmold 16 may include a hole 44 near the distal end for use in hanging the article of cookware for storage. The attachment end 40 is formed over the first end 26 and flange 32 of the insert 14 in such a manner as to define a hole 46 (shown in FIG. 4) that aligns with the screw boss 34 in the insert 14. A portion 45 of the attachment end 40 may extend past the flange 32 to receive a metal flame guard 50 that may be slidably fitted over the extended portion 45. The extended portion 45 of the attachment end 40 may additionally define a receptacle 52 that extends inward from the attachment end 40 toward the flange 32. In this embodiment, the receptacle 52 interfits with a spacer 53 that may be placed in the receptacle 52. As shown in FIG. 2, the spacer 53 may taper in size from a first end 55 to a second end 57. The first end 55 engages the screw boss 18 on the article of cookware, and the second end 57 extends into the receptacle 52. The spacer 52 is tapered in size such that only a portion of the second end 57 fits into the receptacle 52. In this way, the spacer 53 maintains an air gap between the phenolic handle 16 and the vessel 15. The spacer 53 may include a screw hole 54 (shown in FIG. 5) aligned with the hole 46 in the attachment end 40 and the screw boss 34, such that a screw 56 can extend through the hole 44 in the overmold 16, the screw boss 34, and the spacer 53 and into the attachment device 25 and screw boss 18 on the vessel 15 to attach the handle 12 to the vessel 15.

III. Manufacture

Manufacture of the cookware handle generally includes the steps of a) providing a metal insert 14 having an attachment portion 30; b) overmolding a phenolic over the insert 14, the overmold 16 shaped in the form of a cookware handle; and c) attaching the overmold 16 and insert 14 to a cookware vessel 15 with the attachment portion 30 of the insert 14.

In one embodiment, the insert 14 has at least one flat portion 25, and may include a slot 36 or hole extending therethrough. The slot 36 may be a forked end of the insert 14. The attachment portion 30 of the insert 14 may include a flange 32 that extends from one end of the insert 14 and includes a screw boos 34, such that the attachment of the handle 12 to the vessel 10 includes extending a screw through the screw boss 34.

In another embodiment, the phenolic overmold 16 is molded over the insert 14 by compression molding, or another method for molding thermoset polymers. The overmold 16 may be formed over the attachment portion 30 of the insert 14 such that the overmold 16 defines a hole 44 aligned with the screw boss 34 in the insert 14. In this embodiment, the attachment of the handle 10 to the vessel 15 includes extending a screw 56 through the screw boss 34 in the insert 14 and the hole 52 in the overmold 16. The insert 14 may include a forked second end 28 forming a slot 36 extending through the insert 14, and the overmold 16 may be molded such that it extends around the forked end and through the slot 36. The shaped of the forked second end 28 enables the overmold 16 to flow around the forked end and through the slot 36 to improve the attachment of the overmold 16 to the insert 14.

In a more particular embodiment, the handle 12 further includes a flame guard 50 and a spacer 53. The spacer 53 may include a hole 54 for receiving a screw 56. The overmold 16 may define a receptacle 52 molded therein, such that a portion of the spacer 53 may be inserted in the receptacle 52 to maintain a gap between the handle 12 and the vessel 15. The screw hole 54 is aligned with the screw boss 34 in the insert, the screw boss 25 and the hole 44 in the overmold 16, such that the attachment to the vessel 10 includes extending a screw 56 through the screw boss 34, the hole 44 in the overmold 16, and the spacer 53. The flame guard 50 may be slid over the attachment end 45 of the handle 12 before the handle 12 is attached to the vessel 10.

The above description is that of the current embodiment of the invention. Various alterations and changes can be made without departing from the spirit and broader aspects of the invention as defined in the appended claims, which are to be interpreted in accordance with the principles of patent law including the doctrine of equivalents. Any reference to claim elements in the singular, for example, using the articles "a," "an," "the" or "said," is not to be construed as limiting the element to the singular.

The embodiments of the invention in which an exclusive property or privilege is claimed are defined as follows:

1. A cookware handle for attachment to an article of cookware comprising:

a one-piece metal insert including a first portion having a generally flat upper surface and a generally flat lower surface, a second portion that is curved in either an upward or a downward direction and including a distal end and an attachment portion opposite said distal end to attach the handle to the article of cookware, said insert having a lateral edge defining a notch; and a phenolic molding material overmold molded over said insert, including said attachment portion, wherein said overmold includes a first end encapsulating said attachment portion such that the handle is capable of being attached to the article of cookware via said attachment portion, a second end distal from said first end and encapsulating said distal end of said insert, and a length defined between said first end and said second end, wherein said metal insert extends through said overmold along a substantial portion of said length, said overmold extending into said notch to prevent removal of said insert from said overmold, wherein said attachment portion defines a fastener hole and said overmold defines a hole aligned with said fastener hole such that a fastener can extend through said hole in said overmold and said fastener hole in said insert to attach said handle to the vessel.

2. The cookware handle of claim 1 wherein at least a portion of said insert is shaped to correspond to the shape of the cookware handle.

3. The cookware handle of claim 1 wherein said attachment portion of said handle is a screw boss, said handle attached to the article of cookware by extending a screw through said screw boss.

4. The cookware handle of claim 1 wherein said insert includes an upper surface and a lower surface, and a protrusion extending from at least one of said upper surface, said lower surface and said lateral edge, said overmold molded about said protrusion.

5. A cookware handle for attachment to a cookware vessel comprising an overmold molded over a metal insert, a portion of said insert including a notch in a lateral edge of said insert, said insert being curved in at least one of an upward and downward direction and extending through a substantial portion of said overmold to prevent movement of said overmold with respect to said insert, said insert including an attachment portion, said overmold molded about said attachment portion such that said handle is capable of being attached to said vessel via said attachment portion, wherein said attachment portion is a screw boss and said overmold defines a hole aligned with said screw boss such that a fastener can extend through said hole and said screw boss to attach the handle to the vessel.

6. The cookware handle of claim 5 wherein said handle includes a spacer defining a screw hole, and a first end that engages the cookware article, said overmold defining a receptacle at said first end, said receptacle receiving a portion of said spacer such that said spacer maintains a gap between said handle and said cookware vessel.

7. The cookware handle of claim 5 wherein said insert includes a flat portion, said flat portion preventing rotation of said overmold with respect to said insert.

8. A cookware handle for attachment to an article of cookware comprising:

a metal insert for attaching the handle to the article of cookware, said insert including a first end capable of being attached to the article of cookware and a second end opposite said first end, a portion of said insert having a generally flat upper surface and a generally flat lower surface, and a portion of said insert being curved in at least one of an upward or a downward direction, said insert including opposing side edges, at least one of said side edges defining a notch; and a thermoset polymer molding material molded over said insert, said molding material molded over said second end and into said notch, wherein said insert extends through a substantial portion of said molding material to reduce relative movement between said insert and said molding material, wherein said molding material is molded over said first end of said metal insert such that the handle is capable of being attached to the article of cookware via said first end, wherein said first end is a screw boss and said overmold defines a hole aligned with said screw boss such that a fastener can extend through said hole and said screw boss to attach said handle to the vessel.

* * * * *

UNITED STATES PATENT AND TRADEMARK OFFICE
CERTIFICATE OF CORRECTION

| | | |
|---|---|---|
| PATENT NO. | : 7,624,893 B2 | Page 1 of 1 |
| APPLICATION NO. | : 11/277620 | |
| DATED | : December 1, 2009 | |
| INVENTOR(S) | : Hoff et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 880 days.

Signed and Sealed this

Twenty-sixth Day of October, 2010

David J. Kappos
*Director of the United States Patent and Trademark Office*